No. 820,279. PATENTED MAY 8, 1906.
N. C. ALLEN.
HARROW.
APPLICATION FILED AUG. 19, 1905.
2 SHEETS—SHEET 1.
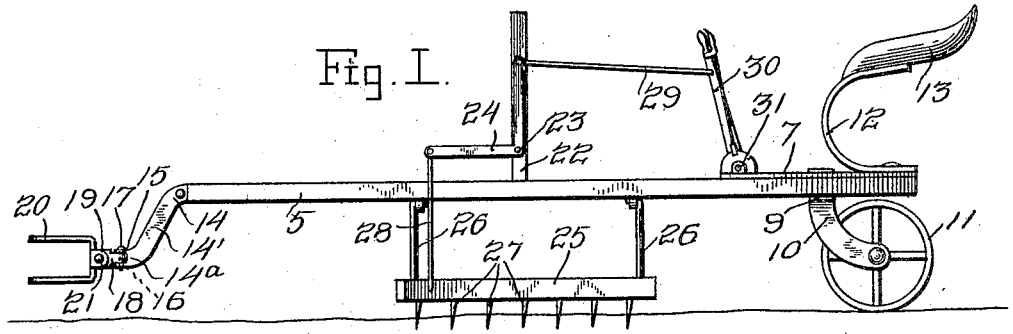
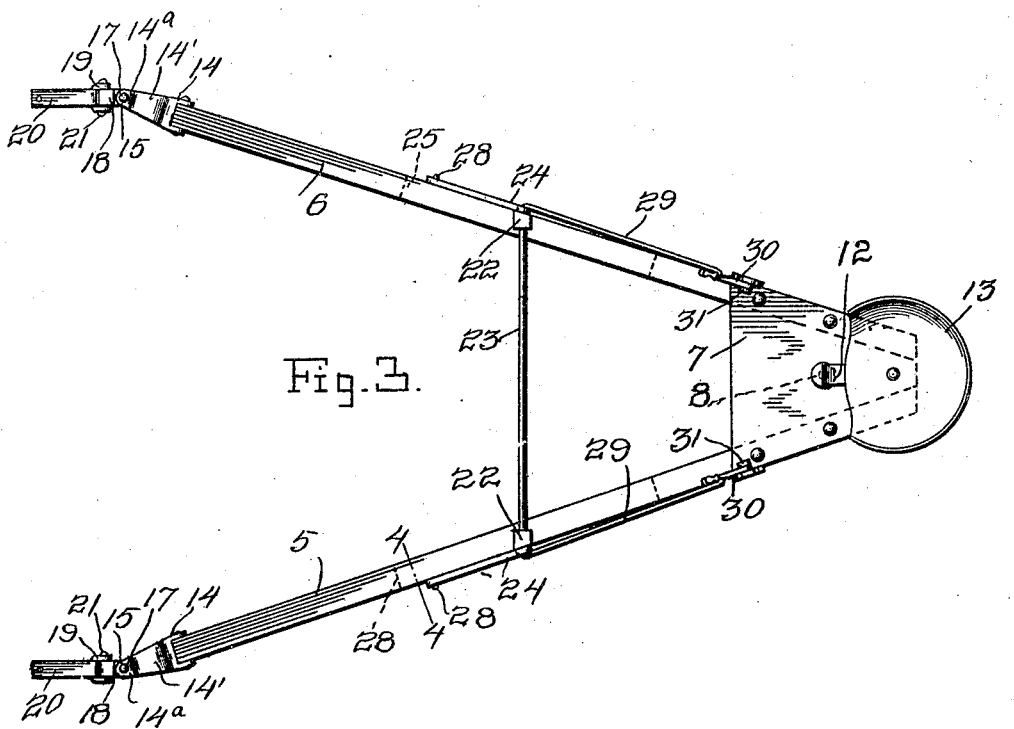

No. 820,279. PATENTED MAY 8, 1906.
N. C. ALLEN.
HARROW.
APPLICATION FILED AUG. 19, 1905.
2 SHEETS—SHEET 2.
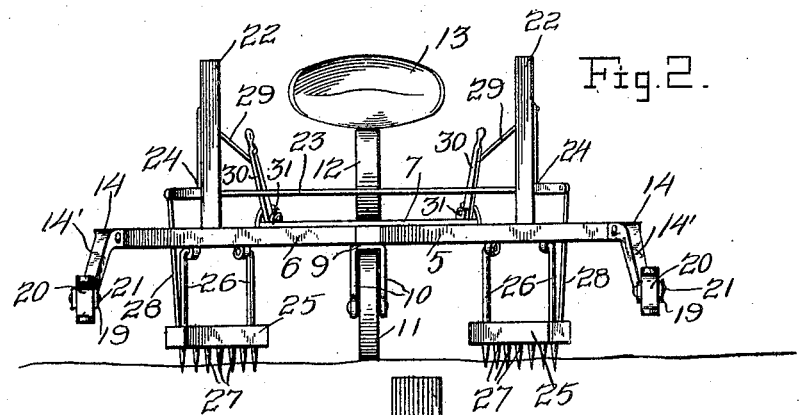
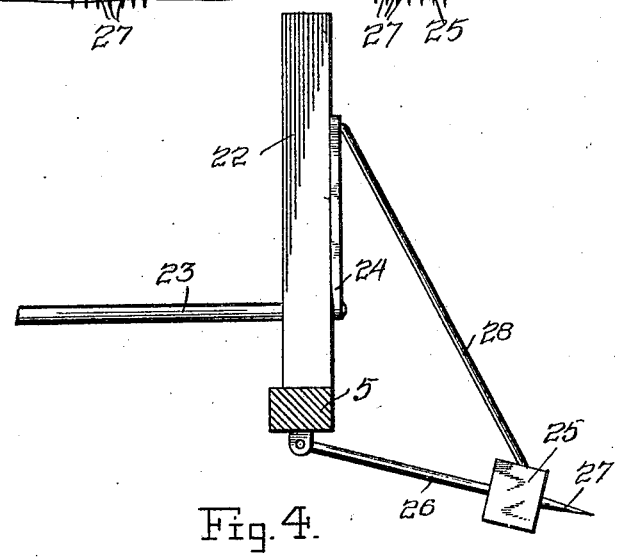

UNITED STATES PATENT OFFICE.

NICHOLAS C. ALLEN, OF HOUGHTON, SOUTH DAKOTA.

HARROW.

No. 820,279.  Specification of Letters Patent.  Patented May 8, 1906.

Application filed August 19, 1905. Serial No. 274,860.

*To all whom it may concern:*

Be it known that I, NICHOLAS C. ALLEN, a citizen of the United States, residing at Houghton, in the county of Brown, State of South Dakota, have invented certain new and useful Improvements in Harrows; and I do hereby declare the following to be a full, clear, and exact description of the invention, such as will enable others skilled in the art to which it appertains to make and use the same.

This invention relates to farm implements, and more particularly to harrows, and has for its object to provide a harrow provided with a seat for the operator and arranged in such a way that the ground-treating devices of the harrow may be raised from the ground when desired.

Another object is to provide a harrow including a novel arrangement of parts and which will be simple in structure.

Other objects and advantages will be apparent from the following specification, which describes an embodiment of the present invention.

In the drawings forming a portion of this specification, and in which like numerals of reference indicate similar parts in the several views, Figure 1 is a side elevation of the present harrow. Fig. 2 is a front view. Fig. 3 is a top plan view. Fig. 4 is a transverse section of line 4 4 on Fig. 3, showing the tooth-carrying frames raised.

Referring now to the drawings, the present invention comprises rearwardly-convergent longitudinally-extending sills 5 and 6, which are attached at their rearward ends to a plate 7, having the form of a truncated isosceles triangle, and this plate is provided with a perforation 8, in which there is journaled the upper portion of a shaft 9, having downwardly and rearwardly curved spaced forks 10 and between which there is journaled a ground-wheel 11. An upwardly-extending curved seat-spring 12 is secured to the plate 7 and has a seat 13 secured to its upper end, which lies above the wheel 11.

Arms 14 are connected at their rearward ends to the forward ends of the sills 5 and 6 and are turned downwardly forwardly of the sills, as shown at 14', the lower portions of the arms being directed forwardly, as shown at 14ª, and being horizontally bifurcated to form spaced fingers 15, having alining openings 16 therein, in each pair of which there is engaged a pivot-pin 17, the latter having blocks 18 pivoted thereon for horizontal movement, and the forward portions of these blocks 18 are engaged between rearwardly-extending spaced fingers 19, carried by clevises 20, pivot-pins 21 being engaged in the fingers 19 and in the blocks 18 for vertical pivotal movement of the clevises, these clevises being connected with the arms 14, as will thus be seen, by universal joints.

Transversely-spaced uprights 22 are secured to the sills 5 and 6 and are connected by a pivot-rod 23, upon which are pivoted levers 24. Harrow-frames 25 are located beneath the sills 5 and 6 and are pivotally connected with supporting-hangers 26 for vertical movement into and out of engagement with the ground, these harrow-frames carrying ground-treating teeth 27. The levers 24 are connected, by means of rods 28, with the harrow-frames and are movable to move these frames upon a pivot, and the levers 24 are connected, by means of rods 29, with hand-levers 30, pivoted at their lower ends between spaced ears 31, carried by the plate 7.

It will thus be seen that the harrow-frames may be moved into and out of operative position through operation of the hand-levers 30 and it will be understood that the harrow-frames are such as are at present in use, it being thus possible to attach old harrows to the hangers 26, these old implements being thus converted into riding-harrows. It will be understood that the clevises are adapted for the attachment of draft means thereto.

What is claimed is—

1. A harrow comprising longitudinally-extending rearwardly-convergent sills, a plate secured to the rearward ends of the sills, a shaft journaled in the plate, downwardly-extending forks carried by the shaft, a ground-wheel journaled between the forks, a seat connected with the plate, clevises located at the forward ends of the sills, universal connections between the clevises and the sills, harrow-frames located beneath the sills and pivotally connected therewith for vertical movement into and out of operative position, levers pivotally connected with the sills, connections between the levers and harrow-frames for movement of the latter when the levers are moved pivotally, ground-treating devices carried by the frame, hand-levers pivoted upon the plate and connections between the hand-levers and the first-named levers for simultaneous movement thereof.

2. A harrow comprising spaced sills, a ground-wheel connected with the sills at the rearward ends thereof and lying in a plane therebelow, downwardly-extending arms carried by the forward ends of the sills, forwardly-extending clevises carried by the lower ends of the arms, universal joints between the clevises and the arms, a seat connected with the sills, harrow-frames carried by the sills therebelow and ground-treating devices carried by the frames.

In testimony whereof I affix my signature in presence of two witnesses.

NICHOLAS C. ALLEN.

Witnesses:
 CHAS. M. GETTY,
 GEORGE HAYS.